United States Patent
Milojevic et al.

(10) Patent No.: US 11,989,763 B1
(45) Date of Patent: May 21, 2024

(54) SELF-CHECKOUT VERIFICATION SYSTEM AND RELATED METHODS

(71) Applicant: Inmar Clearing, Inc., Winston-Salem, NC (US)

(72) Inventors: Marko Milojevic, Jamestown, NC (US); Melissa Bube, High Point, NC (US); Vlad A. Catlan, Winston-Salem, NC (US); Matthew Lingelbach, Clemmons, NC (US); Jared O. Santibanez, Forney, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 17/546,582

(22) Filed: Dec. 9, 2021

(51) Int. Cl.
*G06Q 30/00* (2023.01)
*G06Q 20/18* (2012.01)
(Continued)

(52) U.S. Cl.
CPC ......... *G06Q 30/0609* (2013.01); *G06Q 20/18* (2013.01); *G06Q 20/327* (2013.01);
(Continued)

(58) Field of Classification Search
CPC .. G06Q 30/0609; G06Q 20/18; G06Q 20/327; G06Q 30/0268; G06Q 30/0633; G06V 20/52
See application file for complete search history.

(56) References Cited

U.S. PATENT DOCUMENTS 8,751,316 B1 * 6/2014 Fletchall ............. G07G 1/0081
 705/16
8,876,001 B2 11/2014 Herwig et al.
(Continued)

FOREIGN PATENT DOCUMENTS

EP 2696318 A1 * 2/2014 ............. G06Q 20/18
EP 2800041 A1 * 11/2014 ........... G06Q 20/201
(Continued)

OTHER PUBLICATIONS

"Do It Yourself" Product Scanning System for Supermarket Customers with Anti-Theft Feature: A Proposed Model; Amani Nasser Said Al Julandani et al. Published in: 2020 International Conference on Computing, Networking, Telecommunications & Engineering Sciences Applications (CoNTESA) (pp. 40-44). (Year: 2020).*
(Continued)

*Primary Examiner* — Michael Bekerman
(74) *Attorney, Agent, or Firm* — ALLEN, DYER, DOPPELT, + GILCHRIST, P.A.

(57) ABSTRACT

A self-checkout verification system may include a user device configured to collect user mobile checkout image data from products to be purchased in a store during a mobile checkout process, generate a mobile checkout list of the products to be purchased based upon the collected mobile checkout image data, and process payment based upon the mobile checkout list. The system may also include a self-checkout verification station in the store and configured to obtain the mobile checkout list from the user device, collect verification image data from a plurality of products presented for verification, and generate a verification list based upon the verification image data. The self-checkout verification station may also be configured to determine a discrepancy between the verification list and the mobile checkout list, and generate and communicate a notification based upon the discrepancy.

28 Claims, 5 Drawing Sheets

(51) Int. Cl.
*G06Q 20/32* (2012.01)
*G06Q 30/0251* (2023.01)
*G06Q 30/0601* (2023.01)
*G06V 20/52* (2022.01)

(52) U.S. Cl.
CPC ..... *G06Q 30/0268* (2013.01); *G06Q 30/0633* (2013.01); *G06V 20/52* (2022.01)

(56) References Cited

U.S. PATENT DOCUMENTS

| | | | | |
|---|---|---|---|---|
| 9,892,438 | B1* | 2/2018 | Kundu | G06Q 30/0609 |
| 10,360,551 | B1* | 7/2019 | Perry | G06Q 20/20 |
| 11,244,301 | B2* | 2/2022 | Crooks | G06Q 20/3276 |
| 11,481,751 | B1* | 10/2022 | Chaubard | G06V 10/82 |
| 2009/0216632 | A1* | 8/2009 | Connell, II | G06Q 30/0242 |
| | | | | 705/14.41 |
| 2011/0145051 | A1* | 6/2011 | Paradise | G06Q 30/0601 |
| | | | | 705/26.7 |
| 2012/0095853 | A1* | 4/2012 | von Bose | G06Q 30/0641 |
| | | | | 705/16 |
| 2013/0256403 | A1* | 10/2013 | MacKinnon Keith | |
| | | | | G06Q 20/322 |
| | | | | 235/375 |
| 2014/0046831 | A1* | 2/2014 | Sandler | G06Q 20/3278 |
| | | | | 705/39 |
| 2015/0269549 | A1* | 9/2015 | Herring | G06Q 20/203 |
| | | | | 705/18 |
| 2015/0310601 | A1 | 10/2015 | Rodriguez et al. | |
| 2017/0046707 | A1* | 2/2017 | Krause | G07G 1/14 |
| 2017/0206516 | A1* | 7/2017 | Watson | G06Q 20/3274 |
| 2017/0221031 | A1* | 8/2017 | Atwal | G06Q 20/40 |
| 2018/0096567 | A1* | 4/2018 | Farrow | G06V 40/161 |
| 2018/0165733 | A1 | 6/2018 | Kundu et al. | |
| 2019/0080332 | A1 | 3/2019 | MacKinnon | |
| 2021/0019725 | A1* | 1/2021 | Xiao | G06Q 20/047 |
| 2021/0042730 | A1* | 2/2021 | Lee | G06Q 20/202 |
| 2023/0169508 | A1* | 6/2023 | Murakami | G06Q 20/407 |
| | | | | 705/44 |

FOREIGN PATENT DOCUMENTS

| | | | | | |
|---|---|---|---|---|---|
| EP | 2871618 | A1 * | 5/2015 | | G06Q 20/18 |
| WO | WO-2013142209 | A1 * | 9/2013 | | G06K 5/00 |
| WO | WO-2020206054 | A1 * | 10/2020 | | G06Q 20/20 |
| WO | WO-2021097019 | A1 * | 5/2021 | | G06Q 20/045 |
| WO | WO-2022190101 | A1 * | 9/2022 | | G06Q 20/202 |

OTHER PUBLICATIONS

RFID Item Auditing at Exit from a Retail Store; an IP.com Prior Art Database Technical Disclosure; Kimberly Wood et al.; IP.com No. IPCOM000262564D IP.com Electronic Publication Date: Jun. 12, 2020. (Year: 2020).*

Asuquo, Uduak. "Mobile Self-Checkout Application." (2017). (Year: 2017).*

* cited by examiner

SELF-CHECKOUT VERIFICATION SYSTEM AND RELATED METHODS

TECHNICAL FIELD

The present invention relates to the field of self-checkout, and more particularly, to self-checkout verification systems and related methods.

BACKGROUND

A self-checkout system includes machines that provide a mechanism for customers to complete a purchase transaction on their own without a checkout clerk. During use of a self-checkout system, a user may scan items to be purchased, for example, by scanning item barcodes via a scanner device. Upon completion of scanning, the user is prompted, for example, via a display, to provide a payment for the purchase transaction.

A self-checkout system may be implemented in a checkout area, for example, a checkout lane in a supermarket. A self-checkout system may also be implemented using a mobile wireless communications device associated with the user. For example, the user may use a mobile phone to scan the items and pay for the items in the purchase transaction, thus obviating the need to congregate at a self-checkout lane, for example.

A self-checkout system is relatively popular in supermarkets. However, as costs continue to rise, particularly, labor costs, many retailers are beginning to use a self-checkout system. An area adjacent a self-checkout system is typically supervised by at least one staff member, often assisting customers process transactions, correcting prices, or otherwise providing service. It may be relatively difficult to provide staffing or assistance during a self-checkout when, for example, the user is using a mobile wireless communications device to complete the self-checkout. To address this, many retailers also provide staff at an exit of the retailer store for verification that the products being removed from the store have in fact been purchased.

SUMMARY

A self-checkout verification system may include a user device configured to collect user mobile checkout image data from a plurality of products to be purchased in a store during a mobile checkout process, generate a mobile checkout list of the plurality of products to be purchased based upon the collected mobile checkout image data, and process payment based upon the mobile checkout list. The self-checkout verification system may also include a self-checkout verification station in the store and configured to obtain the mobile checkout list from the user device, and collect verification image data from a plurality of products presented for verification. The self-checkout verification station may further be configured to generate a verification list based upon the verification image data, determine a discrepancy between the verification list and the mobile checkout list, and generate and communicate a notification based upon the discrepancy.

The self-checkout verification station may be configured to prompt the user to purchase products from the verification list not in the mobile checkout list, for example. The self-checkout verification station may be configured to generate a digital promotion and communicate the digital promotion to the user device. The self-checkout verification station may be configured to generate and communicate the digital promotion based upon determining no discrepancy, for example.

The self-checkout verification station may be configured to communicate the notification to the user device, for example. The self-checkout verification station may be configured to communicate the notification to a remote device associated with the store.

The self-checkout verification station may include at least one camera and a controller coupled thereto. The at least one camera may have an associated field-of-view, and the self-checkout verification station may include a conveyor configured to move the products along a path of travel within the field-of-view of the at least one camera, for example.

A method aspect is directed to a method of self-checkout verification in a store. The method may include using a self-checkout verification station to obtain, from a user device, a mobile checkout list of a plurality of products to be purchased in the store. The user device may be configured to collect user mobile checkout image data from the plurality of products to be purchased in the store during the mobile checkout process, generate the mobile checkout list based upon the collected mobile checkout image data, and process payment based upon the mobile checkout list. The method may further include using the self-checkout verification station to collect verification image data from a plurality of products presented for verification, and generate a verification list based upon the verification image data. The method may also include using the self-checkout verification station to determine a discrepancy between the verification list and the mobile checkout list, and generate and communicate a notification based upon the discrepancy.

A computer readable medium aspect is directed to a non-transitory computer readable medium for self-checkout verification in a store. The non-transitory computer readable medium includes computer executable instructions that when executed by a processor cause the processor to perform operations. The operations may include obtaining, from a user device, a mobile checkout list of a plurality of products to be purchased in the store. The user device may be configured to collect user mobile checkout image data from the plurality of products to be purchased in the store during the mobile checkout process, generate the mobile checkout list based upon the collected mobile checkout image data, and process payment based upon the mobile checkout list. The operations may further include collecting verification image data from a plurality of products presented for verification, and generating a verification list based upon the verification image data. The operations may further include determining a discrepancy between the verification list and the mobile checkout list, and generating and communicating a notification based upon the discrepancy.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments. Prime and multiple prime notations are used to refer to like elements in different embodiments.

Figure 1:
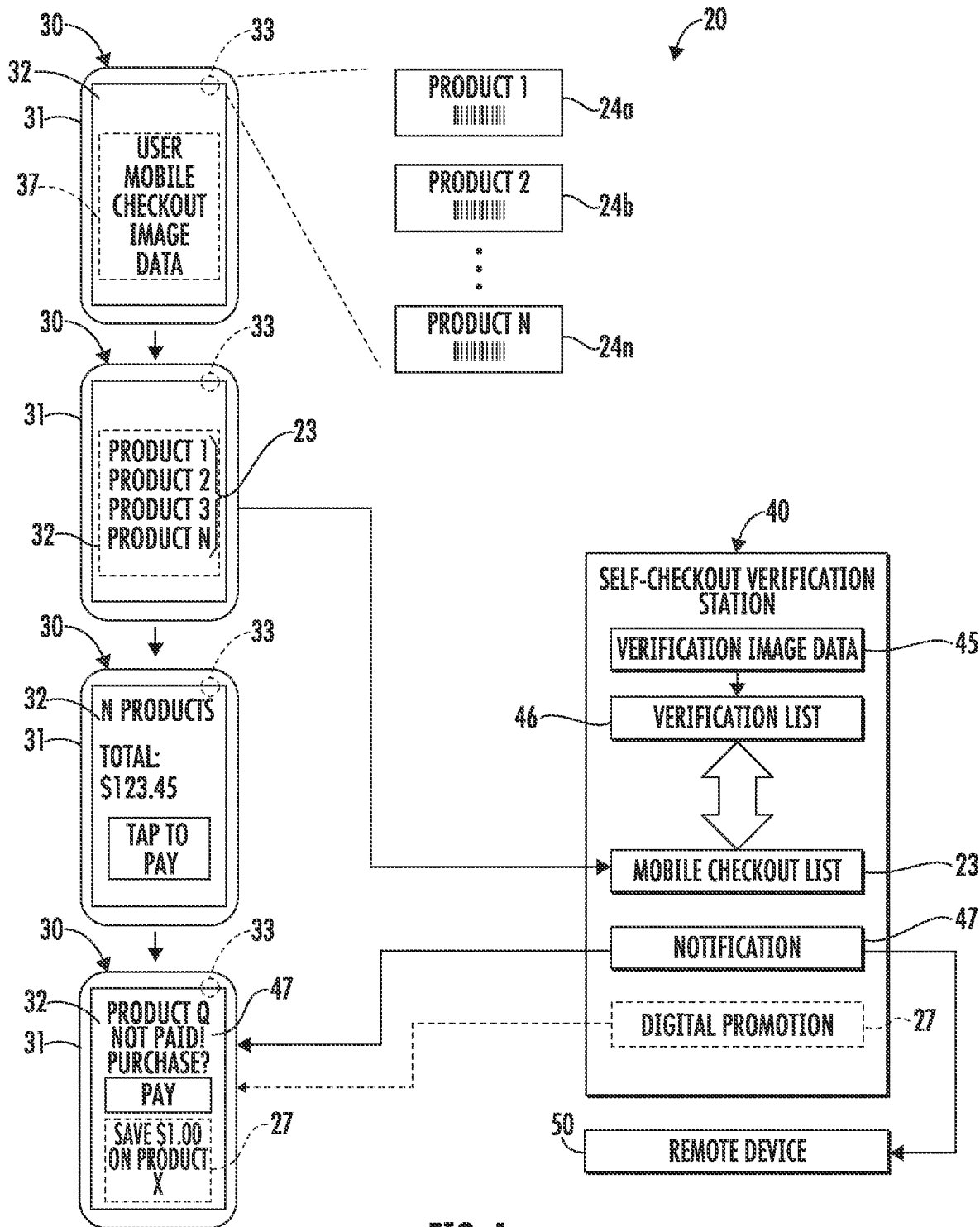
FIG. 1 is a schematic diagram of a self-checkout verification system in accordance with an embodiment.
Figure 2:
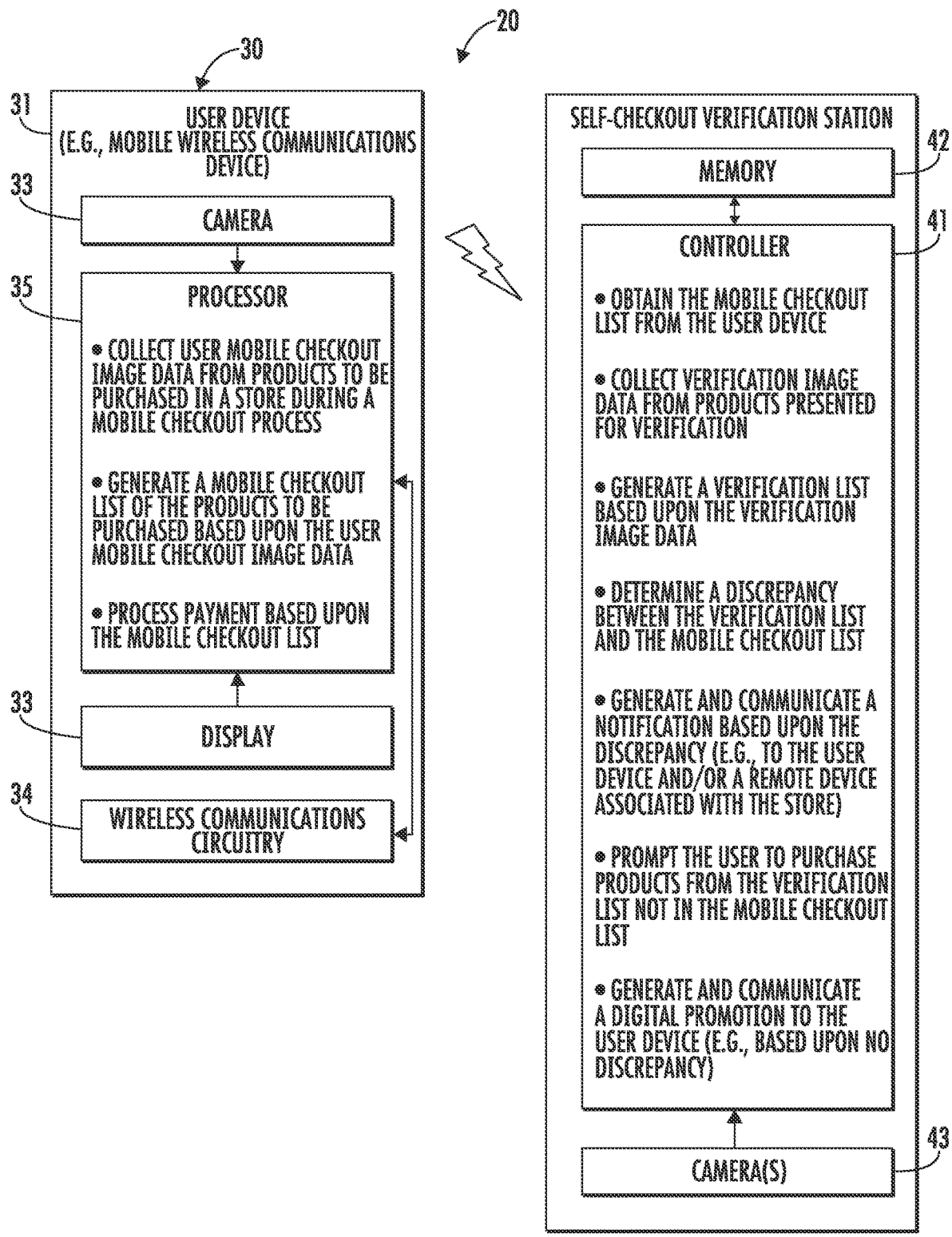
FIG. 2 is a schematic block diagram of the self-checkout verification system of FIG. 1.

Referring initially to FIGS. 1-2, a self-checkout verification system 20 includes a user device 30. The user device is illustratively in the form of a mobile wireless communications device and includes a housing 31, a display 32 carried by the housing (e.g., a touch-screen display), a camera 33 carried by the housing, and wireless communications circuitry 34 also carried by the housing. The mobile wireless communications device 30 also includes a processor 35 coupled to the display 32, the camera 33, and the wireless communications circuitry 34. The user device 30 may be another type of device, for example, a tablet computer or a wearable device. The user device 30 is associated with a given shopper and executes, e.g., by way of the processor 35, an application, for example, associated with a given retailer or a given physical store.

Figure 3:
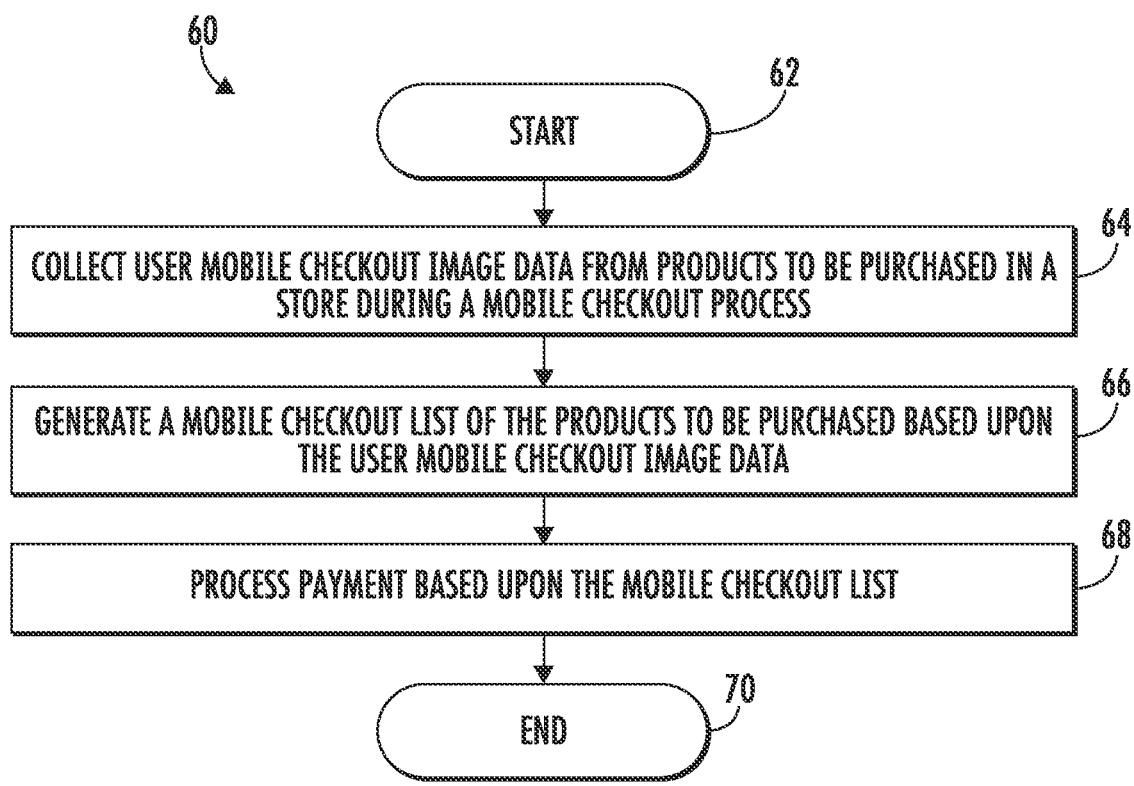
FIG. 3 is a flow diagram illustrating operation of the user device of FIG. 2.

Referring now additionally to the flowchart 60 in FIG. 3, operations of the user device 30 will now be described. While operations of the user device 30 are described herein, it should be appreciated that the operations are performed through operation of the processor 35. Beginning at Block 62, the user device 30 collects user mobile checkout image data 37 from products to be purchased 24a-24n in a store during a mobile checkout process (Block 64). For example, the given shopper may operate the application to, using the camera 33, scan product identifiers (e.g., UPCs, barcodes, image recognition based upon product packaging, size, shape, graphics, etc.) associated with each of the products to be purchased 24a-24n. The given shopper may scan the products to be purchased 24a-24n as they are being removed from the shelves and placed in a shopping card, for example. Machine learning may be used to assist the image recognition process. For example, machine learning may be used to assist in more quickly performing image recognition as it may provide a baseline image recognition based upon certain input parameters, such as, for example, package dimensions, colors, OCR of text, etc.

The given shopper may also place desired products for purchase 24a-24n in the shopping cart and scan the products to be purchased at a later time, for example, prior to leaving the store. Of course, the given shopper may scan the products to be purchased 24a-24n at any time prior to exiting the store or prior to the processing the products to be purchased at a self-checkout verification station 40 in the store, as will be described in further detail below.

At Block 66, the user device 30 generates a mobile checkout list 23, which may be displayed on the display 32 of the user device 30 based upon the collected mobile checkout image data 37. The mobile checkout list 23 includes a listing of the products to be purchased 24a-24n. The given shopper may manually add (e.g., using a product description and/or using a product identifier, such as, for example, a UPC, a barcode), delete, and/or change quantities of products in the mobile checkout list 23. Newly scanned products for purchase 24a-24n may be added to the mobile checkout list 23.

The user device 30 processes payment based upon the mobile checkout list 23 (Block 68). More particularly, the given shopper may provide input to the application to close the transaction or process sale of the products to be purchased 24a-24n. Upon input, for example, to process the payment, the user device 30 may communicate with a payment processing server, for example, associated with a payment processor, to complete the transaction and process the payment. In some embodiments, the user device 30 may process the payment either directly or without a payment processing server or gateway that is associated with a payment processor. Operations end at Block 70.

Figure 4:
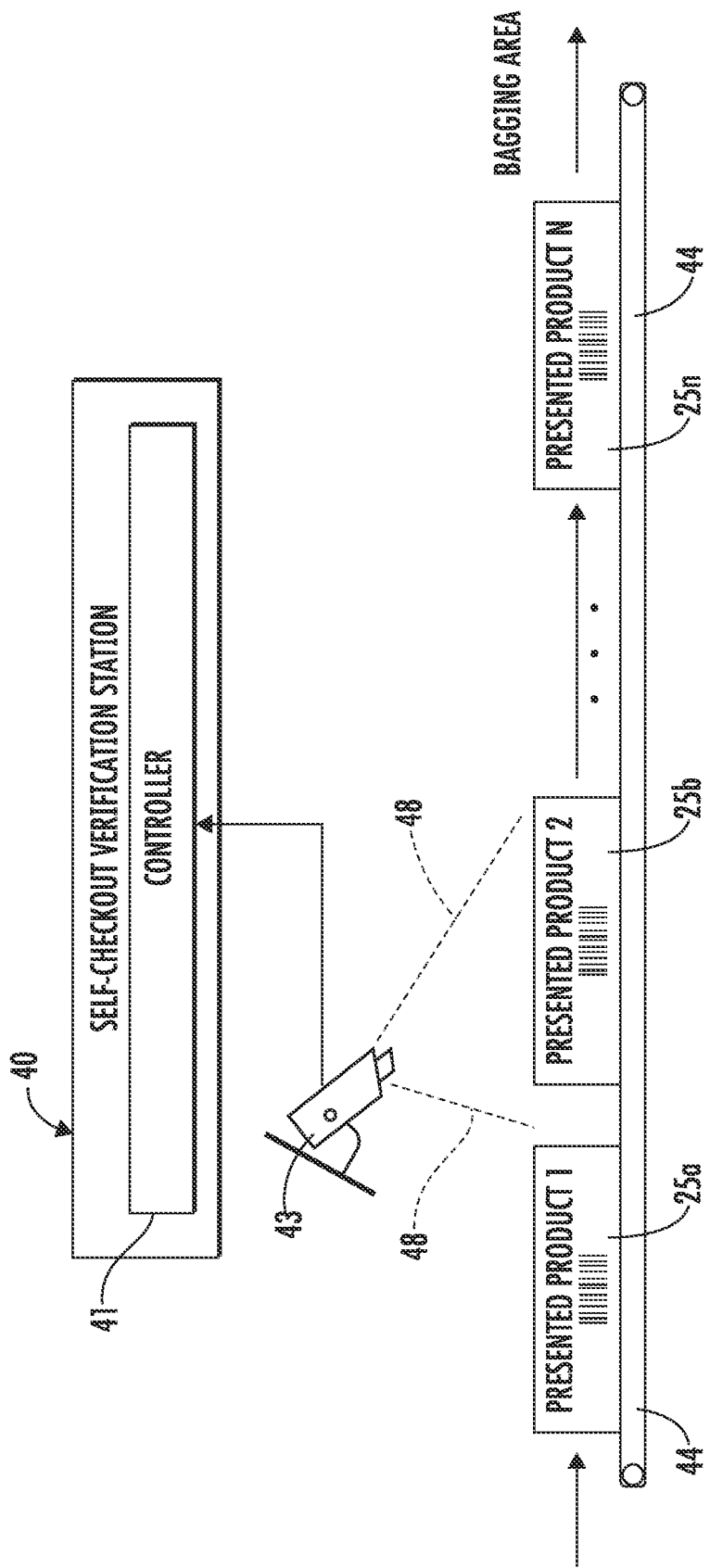
FIG. 4 is a schematic diagram of the self-checkout verification station of FIG. 1.
Figure 5:
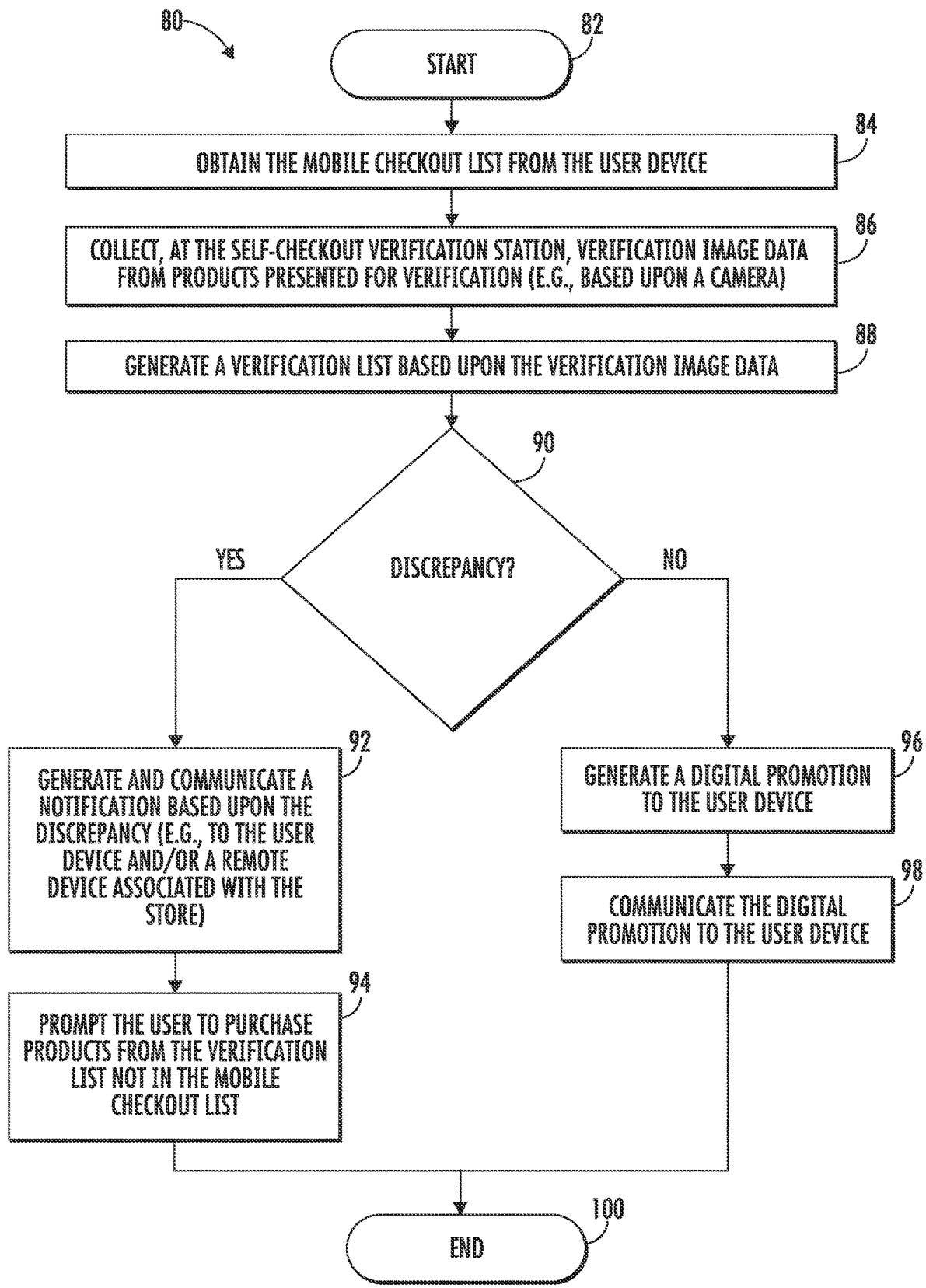
FIG. 5 is a flow diagram illustrating operation of the self-checkout verification station of FIG. 1.

Referring now to FIG. 4 and the flowchart 80 in FIG. 5, beginning at Block 82, operations of the self-checkout verification station 40 will now be described. The self-checkout verification station 40 includes a controller 41 and an associated memory 42 (FIG. 2). Similar to the user device 30, operations of the self-checkout verification station 40 are performed by way of cooperation between the controller 41 and the memory 42.

The self-checkout verification station 40, at Block 84, obtains the mobile checkout list 23 from the user device 30. The self-checkout verification station 40 may obtain the mobile checkout list 23 wirelessly from the user device 30. The user device 30 communicates the mobile checkout list 23 to the self-checkout verification station 40 upon processing payment, for example. In some embodiments, the self-checkout verification station 40 may obtain the mobile checkout list 23 on a per-item basis, that is, as products to be purchased 24a-24n are scanned by the user device 30. Moreover, the self-checkout verification station 40 may obtain the mobile checkout list 23 based upon scanning or based upon an identifier displayed on the display 32 of the user device 30 (e.g., a QR code displayed as a confirmation of payment processing), that may be scanned by a camera 43 coupled to the controller 41 of the self-checkout verification station.

The camera 43 has a field-of-view 48 associated therewith. The self-checkout verification station 40 also includes a conveyor 44 that moves products along a path of travel. For example, the given shopper may unload the products purchased 24a-24n onto the conveyor 44 at the self-checkout verification station 40 to present the products purchased as products presented for verification 25a-25n.

The conveyor 44 moves the products presented for verification 25a-25n within the field-of-view 48. As the products presented for verification 25a-25n are moved through the field-of-view 48 of the camera 43, the self-checkout verification station 40 collects verification image data 45 from the products presented for verification (Block 86), for example, product identifiers (e.g., UPCs, barcodes, image recognition based upon product packaging, size, shape, graphics, etc.). The conveyor 44 may also move to the products presented for verification 25a-25n to a bagging area for assisting the given shopper in collecting and organizing the products presented for verification in the bagging area for removal from the store.

The self-checkout verification station 40 generates a verification list 46 based upon the verification image data 45 (Block 88). The verification list 46 may be generated based upon collected UPCs, for example, or using image recognition techniques to identify the products presented for verification 25a-25n, similar to the mobile checkout list described above with respect to the user device 30.

The self-checkout verification station 40, at Block 90, determines a discrepancy between the verification list 46 and the mobile checkout list 23. The self-checkout verification station 40 may determine the discrepancy based upon there being items or products on the verification list 46 that are not on the mobile checkout list 23. This may, for example, be indicative of the given shopper forgetting or missing to scan a desired product for purchase 24a-24n, which may occur more often when the given shopper is purchasing a larger number of products. Alternatively, the self-checkout verification station 40 may determine the discrepancy based upon there being items or products on the mobile checkout list 23 that are not on the verification list 46.

The self-checkout verification station 40 generates and communicates a notification 47 based upon the discrepancy (Block 92). For example, the self-checkout verification station 40 may communicate a notification 47 to the user device 30 that there is a discrepancy, such as, for example, if there are items or products on the verification list 46 that are not on the mobile checkout list 23. In some embodiments, where there are items or products on the verification list 46 that are not on the mobile checkout list 23, the self-checkout verification station 40 may alternatively or additionally communicate the notification 47 to a remote device 50 associated with the store. For example, the notification 47 may communicate the notification 47 to a loss prevention person employee or officer to address the discrepancy.

Also, when there is a discrepancy (Block 90), the self-checkout verification station 40 may prompt the given shopper, e.g., via the user device 30, to purchase products from the verification list 46 that are not in the mobile checkout list 23 (Block 94). For example, if the given shopper forgot to scan or purchase a product for purchase 24a-24n, the self-checkout verification station 40 may cooperate to prompt the given shopper in the application on the user device 30 to provide input to authorize payment processing for the products not in the mobile checkout list. Payment may be processed for the missing products similar to the techniques described above. Alternatively or additionally, in an embodiment, the self-checkout verification station 40 may include a display to also provide the notification 47 and prompt the given shopper to authorize payment or pay for the missing products. The self-checkout verification station 40 may cooperate with the user device 30 to process the payment, for example, via a short range wireless link (e.g., Bluetooth, NFC, etc.) or via stored information associated with the given shopper (e.g., stored in the user device, stored by the retailer/store from a previous purchase or via a loyalty program).

At Block 96, the self-checkout verification station 40 may generate a digital promotion 27, for example, in the form digital coupon. The digital promotion 27 may be generated when there is no discrepancy, for example, as an incentive to the given shopper to more accurately scan the products or more accurately perform a mobile self-checkout. The digital promotion 27 may be communicated to the user device 40, for example, for display thereon or for storage in a digital wallet associated with the given shopper (Block 98). The digital promotion 27 may be redeemable toward one or more of the purchased products 24a-24n. In other embodiments, the digital promotion 27 may be redeemable toward other products, for example, products considered companion (i.e., often used together) and/or competitor products. Alternatively or additionally, the digital promotion 27 may optionally be generated and communicated to the user device 30 when there is a discrepancy (FIG. 1), for example, which may be based upon payment or purchase of the products not in the mobile checkout list 23. The redeemable value of the digital promotion 27 may be set based upon there being a discrepancy, for example, as the number discrepancies increases, the redeemable value of digital promotion decreases, for example, from a no-discrepancy baseline redeemable value. Operations end at Block 100.

As will be appreciated by those skilled in the art, the self-checkout verification system 20 may be particularly useful for verifying self-checkout purchases and incentivizing a shopper to more accurately process products during a mobile or self-checkout process. Moreover, the cooperation between the user device 30 and the self-checkout verification station 40, particularly, may increase the speed of a mobile checkout process, for example, relative to mobile only or static or fixed self-checkout. Additionally, risk of loss, for example, from theft, may be reduced, and with a reduced amount of staff (e.g., manually verifying self-checkout purchases.

A method aspect is directed to a method of self-checkout verification in a store. The method includes using a self-checkout verification station 40 to obtain, from a user device 30, a mobile checkout list 23 of a plurality of products to be purchased 24a-24n in the store. The user device 30 is configured to collect user mobile checkout image data 37 from the plurality of products to be purchased 24a-24n in the store during the mobile checkout process, generate the mobile checkout list 23 based upon the collected mobile checkout image data, and process payment based upon the mobile checkout list. The method further includes using the self-checkout verification station 40 to collect verification image data 45 from a plurality of products presented for verification 25a-25n, and generate a verification list 46 based upon the verification image data. The method also includes using the self-checkout verification station 40 to determine a discrepancy between the verification list 46 and the mobile checkout list 23, and generate and communicate a notification based upon the discrepancy.

A computer readable medium aspect is directed to a non-transitory computer readable medium for self-checkout verification in a store. The non-transitory computer readable medium includes computer executable instructions that when executed by a processor 35 cause the processor to perform operations. The operations include obtaining, from a user device 30, a mobile checkout list 23 of a plurality of products to be purchased 24a-24n in the store. The user device 30 is configured to collect user mobile checkout image data 37 from the plurality of products to be purchased 24a-24n in the store during the mobile checkout process, generate the mobile checkout list 23 based upon the collected mobile checkout image data, and process payment based upon the mobile checkout list. The operations further include collecting verification image data 45 from a plurality of products presented for verification 25a-25n, and generating a verification list 46 based upon the verification image data. The operations further include determining a discrepancy between the verification list 46 and the mobile checkout list 23, and generating and communicating a notification based upon the discrepancy.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that That which is claimed is:

1. A self-checkout verification system comprising:
a self-checkout verification station in a store;
a mobile wireless communications device associated with a given shopper and comprising wireless communications circuitry, a camera, and a processor coupled to the wireless communications circuitry and the camera, the processor configured to
cooperate with the camera to collect user mobile checkout image data from a plurality of products to be purchased in the store during a mobile checkout process,
generate a mobile checkout list of the plurality of products to be purchased in a purchase transaction based upon the collected mobile checkout image data, and
process payment for the plurality of products to be purchased based upon the mobile checkout list by closing the purchase transaction,
wirelessly communicate the mobile checkout list to the self-checkout verification station upon processing the payment; and
the self-checkout verification station comprising a verification camera, a conveyor, and a controller coupled to the camera and the conveyer, the controller configured to
obtain the mobile checkout list from the mobile wireless communications device, the mobile checkout list being wirelessly communicated via the wireless communications circuitry upon processing the payment,
operate the conveyor to move a plurality of products presented for verification along a path of travel and within a field of view of the verification camera,
cooperate with the verification camera to collect verification image data from the plurality of products presented for verification as the plurality of products is moved along the path of travel,
generate a verification list based upon the verification image data,
determine a discrepancy between the verification list and the mobile checkout list, and when the discrepancy is determined
generate and communicate a notification to the mobile wireless communications device prompting the given shopper to purchase products from the verification list not in the mobile checkout list,
obtain authorization to process a second payment in a second purchase transaction to purchase the products from the verification list not in the mobile checkout list based upon input to the mobile wireless communications device, and
process the second payment for the products from the verification list not in the mobile checkout list based upon the obtained authorization by closing the second purchase transaction.

2. The self-checkout verification system of claim 1 wherein the self-checkout verification station is configured to communicate the notification to a remote device associated with the store.

3. The self-checkout verification system of claim 1 wherein the processor is configured to identify the plurality of products to be purchased based upon image recognition techniques applied to the collected mobile checkout image data, and generate the mobile checkout list based upon the identified plurality of product to be purchased.

4. The self-checkout verification system of claim 3 wherein the processor is configured to use machine learning during image recognition by providing a baseline image recognition.

5. The self-checkout verification system of claim 1 Wherein the self-checkout verification station is configured to generate and communicate a digital promotion to the mobile wireless communications device.

6. The self-checkout verification system of claim 5 wherein the digital coupon has a redeemable value associated therewith; and wherein the controller is configured to, when the discrepancy is determined, lower the redeemable value of the digital coupon, and communicate the digital coupon with the lower redeemable value to the given shopper.

7. The self-checkout verification system of claim 6 wherein the controller is configured to set the redeemable value based upon a number of products from the verification list not in the mobile checkout list.

8. A self-checkout verification station in a store, the self-checkout verification station comprising:
a verification camera;
a conveyor; and
a controller coupled to the camera and the conveyer, and configured to
obtain, from a mobile wireless communications device associated with a given shopper, a mobile checkout list of a plurality of products to be purchased in the store in a purchase transaction, the mobile wireless communications device comprising wireless communications circuitry, a camera, and a processor coupled to the wireless communications circuitry and the camera, the processor configured to cooperate with the camera to collect user mobile checkout image data from the plurality of products to be purchased in the store during the mobile checkout process, generate the mobile checkout list based upon the collected mobile checkout image data, process payment for the plurality of products to be purchased based upon the mobile checkout list by closing the purchase transaction, and wirelessly communicate the mobile checkout list to the self-checkout verification station upon processing the payment,
operate the conveyor to move a plurality of products presented for verification along a path of travel and within a field of view of the verification camera,
cooperate with the verification camera to collect verification image data from the plurality of products presented for verification as the plurality of products for verification is moved along the path of travel,
generate a verification list based upon the verification image data,
determine a discrepancy between the verification list and the mobile checkout list, and when the discrepancy is determined
generate and communicate a notification to the mobile wireless communications device prompting the given shopper to purchase products from the verification list not in the mobile checkout list,
obtain authorization to process a second payment in a second purchase transaction to purchase the products from the verification list not in the mobile checkout list based upon input to the mobile wireless communications device, and process the second payment for the products from the verification list not in the mobile checkout list based upon the obtained authorization by closing the second purchase transaction.

9. The self-checkout verification station of claim 8 wherein the processor of the mobile wireless communications device is configured to identify the plurality of products to be purchased based upon image recognition techniques applied to the collected mobile checkout image data, and generate the mobile checkout list based upon the identified plurality of product to be purchased.

10. The self-checkout verification station of claim 9 wherein the processor of the mobile wireless communications device is configured to use machine learning during image recognition by providing a baseline image recognition.

11. The self-checkout verification station of claim 8 wherein the controller is configured to communicate the notification to a remote device associated with the store.

12. The self-checkout verification station of claim 8 wherein the processor is configured to generate and communicate a digital promotion to the mobile wireless communications device.

13. The self-checkout verification station of claim 12 wherein the digital coupon has a redeemable value associated therewith; and wherein the controller is configured to, when the discrepancy is determined, lower the redeemable value of the digital coupon, and communicate the digital coupon with the lower redeemable value to the given shopper.

14. The self-checkout verification station of claim 13 wherein the controller is configured to set the redeemable value based upon a number of products from the verification list not in the mobile checkout list.

15. A method of self-checkout verification in a store, the method comprising:

using a self-checkout verification station to obtain, from a mobile wireless communications device associated with a given shopper, a mobile checkout list of a plurality of products to be purchased in the store in a purchase transaction, the mobile wireless communications device comprising wireless communications circuitry, a camera, and a processor coupled to the wireless communications circuitry and the camera, the processor configured to collect user mobile checkout image data from the plurality of products to be purchased in the store during the mobile checkout process, generate the mobile checkout list based upon the collected mobile checkout image data, process payment for the plurality of products to be purchased based upon the mobile checkout list by closing the purchase transaction, and wirelessly communicate the mobile checkout list to the self-checkout verification station upon processing the payment, operate a conveyor to move a plurality of products presented for verification along a path of travel and within a field of view of a verification camera, cooperate with the verification camera to collect verification image data from the plurality of products presented for verification as the plurality of products for verification is moved along the path of travel, generate a verification list based upon the verification image data, determine a discrepancy between the verification list and the mobile checkout list, and when the discrepancy is determined generate and communicate a notification to the mobile wireless communications device prompting the given shopper to purchase products from the verification list not in the mobile checkout list, obtain authorization to process a second payment in a second purchase transaction to purchase the products from the verification list not in the mobile checkout list based upon input to the mobile wireless communications device, and process the second payment for the products from the verification list not in the mobile checkout list based upon the obtained authorization by closing the second purchase transaction.

16. The method of claim 15 wherein the processor of the mobile wireless communications device is configured to identify the plurality of products to be purchased based upon image recognition techniques applied to the collected mobile checkout image data, and generate the mobile checkout list based upon the identified plurality of product to be purchased.

17. The method of claim 16 wherein the processor of the mobile wireless communications device is configured to use machine learning during image recognition by providing a baseline image recognition.

18. The method of claim 15 wherein using the self-checkout verification station comprises using the self-checkout verification station to communicate the notification to a remote device associated with the store.

19. The method of claim 15 wherein using the self-checkout verification station comprises using the self-checkout station to generate and communicate a digital promotion to the mobile wireless communications device.

20. The method of claim 19 wherein the digital coupon has a redeemable value associated therewith; and wherein using the self-checkout verification station comprises using the self-checkout verification station to, when the discrepancy is determined, lower the redeemable value of the digital coupon, and communicate the digital coupon with the lower redeemable value to the given shopper.

21. The method of claim 20 wherein using the self-checkout verification station comprises using the self-checkout verification station to set the redeemable value based upon a number of products from the verification list not in the mobile checkout list.

22. A non-transitory computer readable medium for self-checkout verification in a store, the non-transitory computer readable medium comprising computer executable instructions that when executed by a controller cause the controller to perform operations comprising:

obtaining, from a mobile wireless communications device associated with a given shopper, a mobile checkout list of a plurality of products to be purchased in the store in a purchase transaction, the mobile wireless communications device comprising wireless communications circuitry, a camera, and a processor coupled to the wireless communications circuitry and the camera, the processor configured to collect user mobile checkout image data from the plurality of products to be purchased in the store during the mobile checkout process, generate the mobile checkout list based upon the collected mobile checkout image data, process payment for the plurality of products to be purchased based upon the mobile checkout list by closing the purchase transaction, and wirelessly communicate the mobile checkout list to the self-checkout verification station upon processing the payment;

operating a conveyor to move the plurality of products presented for verification along a path of travel and within a field of view of a verification camera cooperating with the verification camera to collect verification image data from the plurality of products presented for verification as the plurality of products for verification is moved along the path of travel;

generating a verification list based upon the verification image data;

determining a discrepancy between the verification list and the mobile checkout list, and when the discrepancy is determined generating and communicating a notification to the mobile wireless communications device prompting the given shopper to purchase products from the verification list not in the mobile checkout list, obtaining authorization to process a second payment in a second purchase transaction to purchase the products from the verification list not in the mobile checkout list based upon input to the mobile wireless communications device, and processing the second payment for the products from the verification list not in the mobile checkout list based upon the obtained authorization by closing the second purchase transaction.

23. The non-transitory computer readable medium of claim 22 wherein the processor of the mobile wireless communications device is configured to identify the plurality of products to be purchased based upon image recognition techniques applied to the collected mobile checkout image data, and generate the mobile checkout list based upon the identified plurality of product to be purchased.

24. The non-transitory computer readable medium of claim 23 wherein the processor of the mobile wireless communications device is configured to use machine learning during image recognition by providing a baseline image recognition.

25. The non-transitory computer readable medium of claim 22 wherein the operations comprise communicating the notification to a remote device associated with the store.

26. The non-transitory computer readable medium of claim 22 wherein the operations comprise generating and communicating a digital promotion to the mobile wireless communications device.

27. The non-transitory computer readable medium of claim 26 wherein the digital coupon has a redeemable value associated therewith; and wherein the operations comprise, when the discrepancy is determined, lowering the redeemable value of the digital coupon, and communicating the digital coupon with the lower redeemable value to the given shopper.

28. The non-transitory computer readable medium of claim 27 wherein the operations comprise setting the redeemable value based upon a number of products from the verification list not in the mobile checkout list.

* * * * *